Feb. 28, 1933. A. GOTELLI 1,899,863
FRUIT PITTING MACHINE
Filed Oct. 2, 1930 5 Sheets-Sheet 2
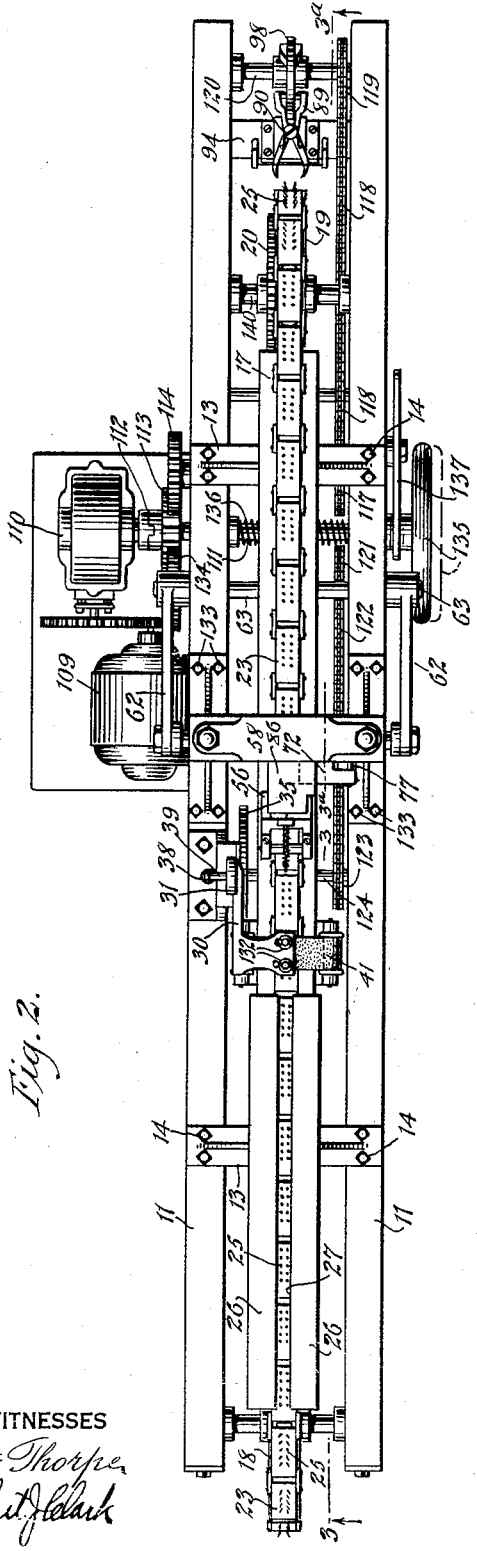
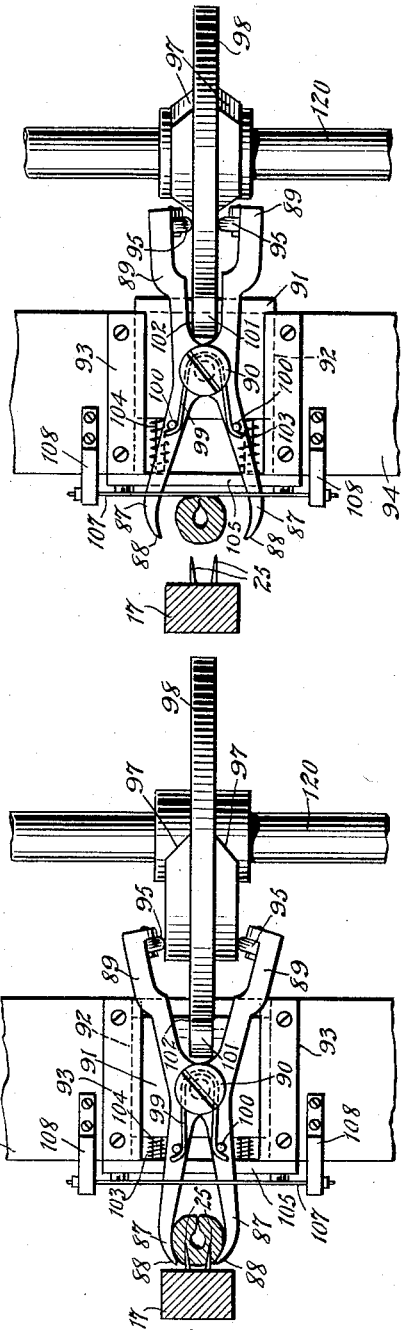
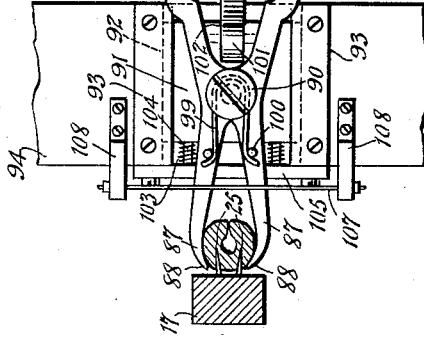
INVENTOR
Anthony Gotelli
BY
ATTORNEY Feb. 28, 1933.  A. GOTELLI  1,899,863
FRUIT PITTING MACHINE
Filed Oct. 2, 1930  5 Sheets-Sheet 3

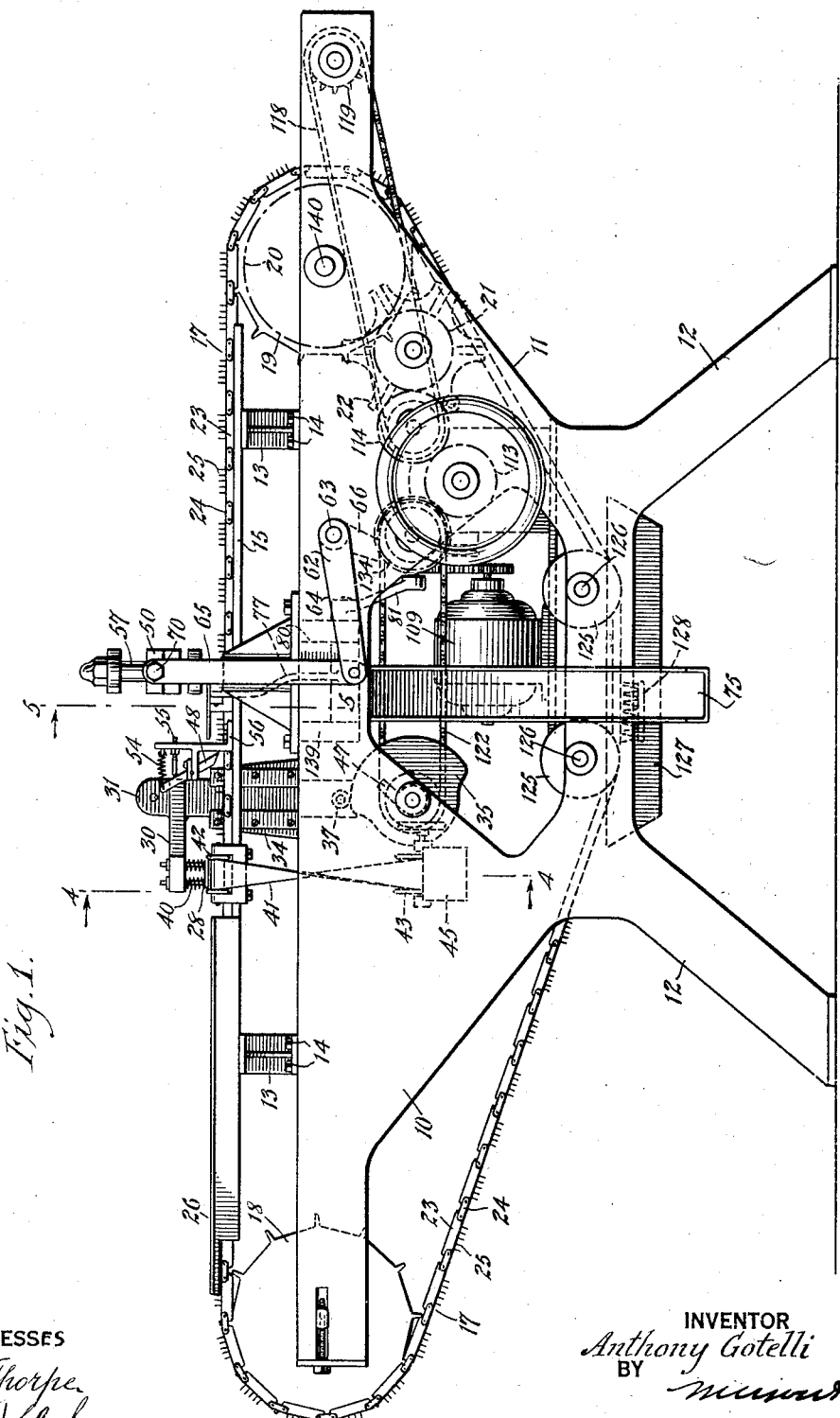

Fig. 3.

INVENTOR
Anthony Gotelli
BY
ATTORNEY

WITNESSES

Feb. 28, 1933.  A. GOTELLI  1,899,863
FRUIT PITTING MACHINE
Filed Oct. 2, 1930  5 Sheets-Sheet 4

INVENTOR
Anthony Gotelli
BY
Munn & Co.
ATTORNEY

WITNESSES
Edw. Thorpe
Albert Clark

Feb. 28, 1933.  A. GOTELLI  1,899,863
FRUIT PITTING MACHINE
Filed Oct. 2, 1930   5 Sheets-Sheet 5
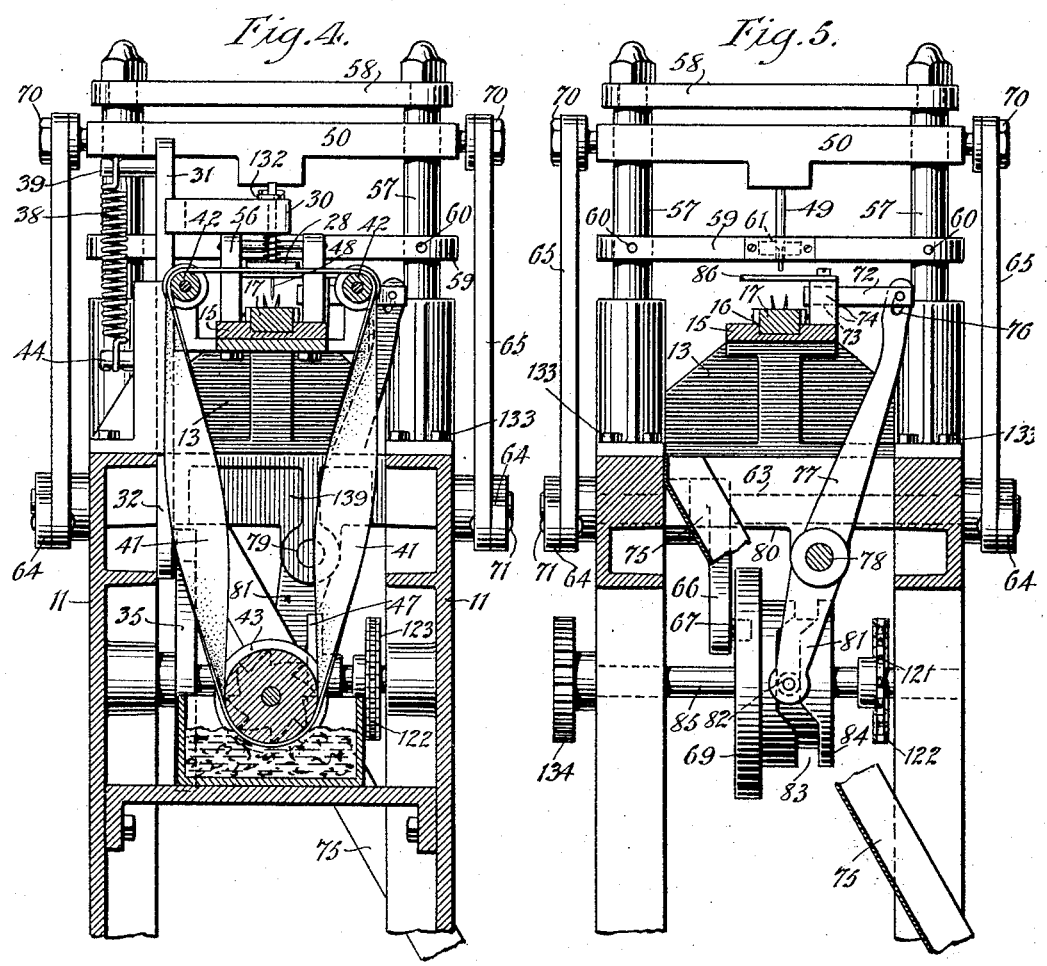
INVENTOR
Anthony Gotelli
BY
ATTORNEY Patented Feb. 28, 1933

1,899,863

UNITED STATES PATENT OFFICE

ANTHONY GOTELLI, OF BROOKLYN, NEW YORK

FRUIT PITTING MACHINE

Application filed October 2, 1930. Serial No. 486,019.

The present invention relates to fruit-pitting machines and has in view the provision of a machine for the pitting of fruit having a single elongated seed.

More specifically, the present invention is particularly applicable to the pitting of dried fruits, such as dates, although it is not limited in its use to such application.

The invention contemplates the pitting of such dried fruits as they are received on the market packed in containers under pressure, which packing deforms the fruit and in many instances pushes the pit out of its normal central position in the fruit.

The primary object of the invention therefore is the provision of a machine which will efficiently remove the pits from dried and deformed fruit without mutilating the fruit or losing some of the meat which has a tendency to cling to the pits.

To accomplish this end the invention provides means for holding the fruit and for positioning the pits in the path of an ejecting instrumentality. The said means also securely holds the fruit while it is being slit and when the pit is being ejected, in such a manner as to present macerating of the fruit. After the pits are removed from the fruit they are ejected from the path of travel of the fruit and means is provided for removing the pitted fruit without mutilating the meat thereof.

With these and other objects in view the invention resides in the novel features of construction and arrangement of parts which will be more fully described hereinafter.

Referring to the accompanying drawings illustrating one embodiment of the invention, Fig. 1 is a view in elevation of a fruit-pitting machine embodying the present invention in which portions of the machine are shown in dotted outline;

Fig. 2 is a top plan view thereof;

Fig. 3 is a longitudinal sectional view on line 3/3 of Fig. 2 of one end of the machine;

Fig. 3a is a longitudinal sectional view of the other end of the machine shown on line 3a/3a of Fig. 2;

Fig. 4 is a cross-sectional view of the upper portion of the machine on line 4/4 of Fig. 1;

Fig. 5 is a cross-sectional view of a portion of the machine on line 5/5 of Fig. 1;

Fig. 6 is a cross-sectional view of the conveyor and platform showing a date as it is impaled on the pins by the operator;

Fig. 7 is a cross-sectional view of the conveyor and a portion of the platform showing the presser foot for forcing the fruit upon the pins;

Fig. 8 is a longitudinal-sectional view of a portion of the conveyor platform showing a date in position on the conveyor after it has been cut by the knife;

Fig. 9 is a view similar to Fig. 8 but showing the pit about to be ejected;

Fig. 10 is a cross-sectional view of the conveyor and platform showing the pit being ejected from the conveyor;

Fig. 11 is a top plan view of the finger mechanism for removing the pitted date from the conveyor and in gripping position to remove the date;

Fig. 12 is a similar view of Fig. 11 showing the date removed from the conveyor and released by the finger mechanism;

Fig. 13 is a side view of the cam producing the vertical reciprocating movement of the ejector, and Fig. 14 is a modified form of ejector.

In the embodiment of the invention illustrated in the accompanying drawings, the machine includes a suitable frame 10 consisting of side members 11 having legs 12, and connected by cross-beams 13 secured upon the top thereof by bolts 14. The beams 13 support a platform 15 having a longitudinal rectangular slot 16 constituting a track for an endless conveyor 17. This conveyor operates around sprocket wheels 18 and 19 journalled between the side members 11 at opposite ends of the frame. The shaft carrying the sprocket wheel 19 has rigidly secured thereon a geared wheel 20 which meshes with a geared pinion 21 carried by an intermittent motion device 22 for producing an intermittent or step-by-step movement of the conveyor over the platform.

The conveyor carries the fruit through the machine and for that purpose includes rectangular blocks 23 connected together by links 24 pivoted to the ends of adjacent blocks. The said blocks are each provided with two parallel rows of upwardly extending pins 25 upon which the fruit is impaled and which are spaced apart the required distance for receiving therebetween the pit "A" of the fruit as shown in Fig. 7. The rows diverge outwardly towards the top and as the pit is received therebetween the inwardly and downwardly sloping pins move the pit to a central position between the rows. The longitudinal center line of the conveyor and track is midway between the rows of pins so that when the pit is positioned between the pins it is in alignment to be acted upon by the ejector after the fruit has been slit.

Supported upon the forward end of the platform is a table 26 having a longitudinal opening or slot 27 therethrough, the said table being elevated above the track sufficiently to permit the pins to extend a short distance into the said slot. The said table is a receiving table for the fruit, the operator of the machine picking up the fruit one at a time and impaling it upon the ends of the pins as shown in Fig. 6. After the fruit is thus impaled on the pins it is moved by the conveyor in a step-by-step movement along the track until it reaches a presser foot 28 which forces the fruit completely on the pins, as shown in Fig. 7. The presser foot 28 has a vertical reciprocating movement, the downward movement of which impales the fruit on the pins as just described, and centers the pit between the rows of pins. This downward movement is timed to take place between the step-movements of the conveyor when the conveyor is momentarily at rest, and when a block 23 is in central position under the foot.

The foot 28 is carried by vertical rods 29, the upper ends of which are slidably mounted in openings in the outer end of an arm 30 of a vertical reciprocating bar 31. This bar is movable in the guideway 32 formed by plates 33 secured to a bracket 34, which latter is secured to the top of one of the side members 11. The upward movement of the bar 31 is produced by a lifting cam 35 on which moves a follower roller 36 revolubly mounted on a pin 37 carried by the lower end of the said bar, the downward movement of the bar being produced by a contractile spring 38, the upper end of which is connected to a pin 39 projecting outwardly from the upper end of the said bar, the lower end of the spring being attached to a pin 44 projecting outwardly from the bracket 34. The rods 29 carrying the presser foot are held on the arm 30 by means of the pins 132 and between the said arm and the presser foot coiled springs 40 are arranged on the said rods, which arrangement provides a cushioning effect on the downward movement of the presser foot.

In order to prevent the fruit adhering to the bottom of the presser foot an endless wiping belt 41 is provided, the upper horizontal run of which moves under the said foot and between the foot and the fruit. This belt has an intermittent motion and is at rest when the presser foot is forcing the fruit on to the pins. The said belt operates over spools 42 revolubly mounted in brackets secured to the platform, one on each side and around a lower spool 43 revolving in a liquid bath in a trough 45. The spool 43 revolves in bearings carried by the trough 45, one end of the shaft mounting the said spool carrying a toothed wheel 46 which is rotated by a rotating finger 47 to provide an intermittent motion to the said belt. This belt is twisted between the upper and lower pulleys so that the reverse side is presented to the washing liquid in the trough as the belt revolves around the spool 43.

The fruit impaled on the pins 25 moves with the conveyor under a knife 48 which slits the fruit lengthwise above the pit and at the ends. This operation puts the fruit in condition for the removal of the pit, which is accomplished by a vertical reciprocating ejector 49 depending from a crossbar 50 and positioned in the path of movement of the fruit upon the conveyor. The ejector 49 at the bottom of its downward stroke enters the slit in the forward end of the fruit and obstructs the onward movement of the pit, thus causing the pit to be ejected from the slit as the fruit is moved under the ejector.

The knife 48 is pivoted on horizontal arms 51 of a bracket 52 and is inclined towards the rear of the machine as is likewise the cutting edge 53. A contractile spring 54 connected between the upper end of the knife and the bracket 52 resiliently holds the knife in inclined position against a set stud 55 adjustably mounted in the bracket. As the fruit is cut by movement under the knife edge 53 the knife receives a dragging action which rocks it on its pivot against the action of the spring 54. The knife is set to make a deep cut in the ends of the fruit, as shown in Fig. 8, the rocking action taking place when the knife strikes the pit, permitting the knife to ride over the top of the same. The bracket 52 is supported on the platform 15 straddling the conveyor, the side posts 56 of the bracket being bolted at their bases to the platform.

The crossbar 50 carrying the said ejector is mounted to slide on vertical guide posts 57 which are supported upon the side members 11 and secured thereto by bolts 133. The said posts are connected at their top by a cross head 58 and are provided with a lower cross member 59 adjustably secured thereto by studs 60. This cross member has a central opening 61 through which moves the ejector 49, the said bar having a large inner cavity adjacent the said openings 61 which is filled with moistened spongy material to wipe off the end of the ejector and to moisten it so that it will not stick to the fruit. The crossbar 50 receives its motion from a crank 62 having a through shaft 63 journalled in the side members 11 on the ends of which shaft are located crank arms 64 connected to the ends of the cross-bar 50 by connecting rods 65. An arm 66 of the crank 62 has a roller 67 which moves in a cam groove 68 in the one face of a wheel 69, imparting a rocking motion to the said crank and transmitting a vertical reciprocating movement to the cross-head through the said connecting rods, the said connecting rods being pivoted at their upper ends to the cross-bar on the pins 70 and to the crank arms 64 by the pins 71.

Upon being ejected the pits fall upon the blocks 23 of the conveyor at the rear of the pins 25 as shown in Fig. 9. A laterally moving rectangular bar 72 operating in a guide 73 in a block 74 secured to the platform 15 kicks or ejects the pits from the conveyor and into a chute 75. The bar 72 is pivoted at its end in a slot 76 in the upper end of a crank arm 77. The arm 77 is secured to a crank shaft 78 which is journalled in bearings 79 and 138 in channel members 80 and 139 respectively bolted at their ends to the side members 11. An arm 81 secured on the one end of the shaft 78 is provided with a roller 82 which is arranged to move in an offset slot 83 formed on an enlarged hub 84 of the wheel 69. The arm 81 receives a lateral movement by the hub revolving on its shaft 85, which movement of the said arm transmits a lateral reciprocating movement to the upper end of the crank arm 77 and to the bar 72. This lateral movement of the said bar takes place over the rearward end of each block 23 of the conveyor just after the pit has been ejected from the fruit. A flat plate 86 is secured to the top of the block 74 extending laterally across the track. This plate serves as a guard to replace the fruit on the pins that may be raised by the action of the knife.

At the rearward end of the machine a finger mechanism is provided to pick off the pitted fruit from the pins 25. This mechanism comprises oppositely arranged fingers 87 having inwardly extending claw-like forward ends 88 and rearwardly extending outwardly diverging shanks 89, the said fingers forwardly of the shanks 89 being pivoted by a pin 90 to a plate 91. This plate is slidably mounted in a horizontal channel 92 formed by the side plates 93 secured to a horizontal cross bar 94 which latter is secured at its ends to the side members 11. The fingers 87 have an opening and closing action on the pivot pin 90, the closing action taking place when the shanks 89 are being expanded by a follower roller 95 mounted on the downwardly projecting end 96 of each of said shanks operating over cam surfaces 97 of a cam wheel 98. The opening action of said fingers is produced by a wire spring 99 the ends of which butt against the pins 100 carried by the said fingers, this spring being bent around the pin 90 under the head thereof which holds it in position.

The peripheral face of the cam wheel 98 operates against a cam roller 101 rotatably mounted in a slot 102 in the plate 91. This roller is held against the said face or rim by coiled springs 103 positioned on pins 104 carried by a plate 105, the said pins having their ends slidable in openings 106 in the plate 91. When the fingers are in the act of closing, due to the opening of the shanks 89, the plate 91 is being moved forwardly by the action of the cam wheel 98 against the roller 102, thus producing a forward movement of the finger mechanism and a closing of the fingers on the fruit when the said mechanism is at the end of its forward stroke, as shown in Fig. 11. On the rearward stroke of the finger mechanism produced by the springs 103 the claw ends 88 strip the fruit from the pins, the fruit being released by the fingers when they are opened by the action of the spring 99. A wire 107 suspended between bars 108 above the said fingers acts as a stop to prevent further movement of the fruit with the finger mechanism. It is understood that the finger mechanism is at the forward end of its stroke and in gripping position as each set of pins is brought into horizontal alignment with the said mechanism.

The operating parts may be driven by any preferred means and as shown a motor 109 is geared to a reduction speed device 110, the driving shaft of which is connected to a shaft 111 by a clutch 112. Adjacent said clutch on the shaft 111 is a gear wheel 113 which meshes with a gear 134 positioned on the one end of the shaft 85. The shaft carries the cam wheel 69, the movement of which produces the reciprocating movement of the cross-bar 50 and the ejector bar 72, as hereinbefore described. The gear 113 also meshes with another gear 114 positioned on the end of a shaft 115 on which shaft is located the cooperating member 116 of the intermittent motion device 22 which imparts the positive step-by-step motion to the conveyor through the sprocket wheel 19 on shaft 140. The shaft 115 is provided with a sprocket wheel 117 which by means of the endless chain 118 drives the sprocket wheel 119 secured on a shaft 120. This latter shaft carries the cam wheel 98 which transmits motion to the finger mechanism. The shaft 85 carries a sprocket wheel 121 around which moves the endless chain 122 operating at its other end over a sprocket wheel 123 carried by a shaft 124; the latter shaft carries the lifting cam 35, the turning of which produces the vertical reciprocating motion of the presser foot 28. The shaft 124 also carries the revolving finger 47 which produces the intermittent motion of the wiping belt 41.

The bottom run of the conveyor operates under idler rollers 125 positioned on shafts 126 and mounted to revolve in bearings carried by the side members 11. This run of the conveyor dips into a water bath in a trough 127. A brush 128 positioned in the said trough is adapted to clean the pins of the conveyor.

Any preferred intermittent motion device may be employed to give a positive step-by-step movement to the conveyor. The device 22 illustrated in the drawings is known as a Geneva movement but any other form may be employed.

In Fig. 14 is illustrated a modified form of ejector. In this form the ejector 129 is mounted on a bracket 130 similar to the bracket 52. The ejector 129 likewise is mounted on the said bracket in the same manner as the knife 48 is mounted on the bracket 52. When this form of ejector is used the guide posts 57 are removed from the machine and the bracket 130 positioned on the platform in place thereof.

The operating parts may be disconnected from the motor 109 by throwing out the clutch 112. This is done by pulling the hand wheel 135 outwardly against the action of a spring 136 mounted upon the shaft 111. This spring operates to hold the parts of the clutch in mesh. When the hand wheel 135 is pulled out to the dotted position shown in Figure 2, a bar 137 is adapted to fall into position behind the hub of the hand wheel, thus holding the clutch disconnected. In this position the machine may be operated by hand by the turning of the hand wheel.

I claim:

1. In a fruit pitting machine, a conveyor for carrying the fruit, said conveyor including upwardly extending rows of pins on which the fruit is impaled, the pins in adjacent rows being arranged in diverging relation and operating to position the pit in the path of an ejector, means for slitting the fruit and an ejector for forcing the pit through the slit.

2. In a fruit pitting machine, a conveyor, said conveyor including rows of pins on which the fruit is impaled, the pins in adjacent rows being arranged in diverging relation, means for slitting the fruit between the rows of pins and means for ejecting the pit from between the said rows.

3. In a fruit pitting machine, a conveyor, said conveyor including rows of pins on which the fruit is held in position, means for centering the pit between the said rows, means for slitting the fruit above the pit between the rows of pins and means for ejecting the pit from between said rows of pins and through the said slit.

4. In a fruit pitting machine, a conveyor for moving the fruit, said conveyor including pins for holding the fruit on the conveyor, a vertical reciprocating presser means for forcing the fruit onto the said pins, a knife for slitting the fruit, and an ejector for removing the pit through the slit.

5. In a fruit pitting machine, a conveyor upon which the fruit is moved, said conveyor including rows of pins for holding the fruit, said rows of pins projecting upwardly in diverging relation, means for forcing the fruit onto the said rows of pins and for centering the pit between the said rows, means for slitting the fruit between the said rows of pins and an ejector for removing the pit through the said slit.

6. In a fruit pitting machine, an endless conveyor upon which the fruit is moved, said conveyor including a series of connected blocks, parallel rows of pins mounted on said blocks for holding the fruit, said rows extending longitudinally of the machine, a knife for slitting the fruit mounted above the said conveyor and projecting between the said rows of pins and a pit ejector located above the conveyor movable to a position between the rows of pins and in the path of the pit moving with the fruit.

7. In a fruit pitting machine, an endless conveyor upon which the fruit is moved, said conveyor including a series of connected blocks, parallel rows of pins mounted on said blocks for holding the fruit, said rows extending longitudinally of the machine, a knife for slitting the fruit mounted above the said conveyor and projecting between the said rows of pins, a pit ejector located above the conveyor movable to a position between the rows of pins and in the path of the pit moving with the fruit, said ejector forcing the pit through the said slit and upon the conveyor and a laterally reciprocating ejector for removing the pit from the conveyor.

8. In a fruit pitting machine, an endless conveyor upon which the fruit is moved, said conveyor including a series of connected blocks, parallel rows of pins mounted on said blocks for holding the fruit, said rows extending longitudinally of the machine, a knife for slitting the fruit mounted above the said conveyor and projecting between the said rows of pins, a pit ejector located above the conveyor movable to a position between the rows of pins and in the path of the pit moving with the fruit and means for removing the pitted fruit from the said pins.

9. In a fruit pitting machine, an endless conveyor upon which the fruit is moved, said conveyor including a series of connected blocks, rows of diverging pins mounted on said blocks for holding the fruit, means for forcing the pit between the said rows, a knife for slitting the fruit located above the said conveyor and projecting between the said rows of pins and an ejector movable to a position between the said rows of pins for removing the pit through the said slit.

10. In a fruit pitting machine, an endless conveyor upon which the fruit is moved, said conveyor including a series of connected blocks, rows of diverging pins mounted on said blocks for holding the fruit, a vertical reciprocating presser for positioning the fruit on said pins and the pit between the said rows, a knife for slitting the fruit located above the said conveyor, and projecting between the said rows of pins, and an ejector movable to a position between the said rows of pins for removing the pit through the said slit.

11. In a fruit pitting machine, an endless conveyor upon which the fruit is moved, said conveyor including a series of connected blocks, parallel rows of diverging pins mounted on said blocks for holding the fruit, a vertical reciprocating presser for positioning the fruit on said pins and the pit between the said rows, a knife for slitting the fruit located above the said conveyor, and projecting between the said rows of pins, an ejector movable to a position between the said rows of pins for removing the pit through the said slit and means for removing the pitted fruit.

12. In a fruit pitting machine, a conveyor, said conveyor including rows of pins on which the fruit is held in position and moved with the conveyor, means for positioning the pit between the said rows, means for slitting the fruit between the rows of pins and means for ejecting the pit through the slit from between the said rows.

Signed at New York city in the county of New York and State of New York this 25th day of September 1930.

ANTHONY GOTELLI.